US009419363B2

(12) United States Patent
Da Rocha

(10) Patent No.: US 9,419,363 B2
(45) Date of Patent: Aug. 16, 2016

(54) DEVICE FOR ELECTRICALLY CONNECTING AN ELECTRIC POWER SUPPLY SOURCE TO AN ELECTRIC APPLIANCE, CORRESPONDING ELECTRIC APPLIANCE AND ELECTRIC CONNECTION METHOD

(71) Applicant: VIRAX, Epernay (FR)

(72) Inventor: Franck Da Rocha, Puisieulx (FR)

(73) Assignee: VIRAX, Epernay (FR)

( * ) Notice: Subject to any disclaimer, the term of this patent is extended or adjusted under 35 U.S.C. 154(b) by 0 days.

(21) Appl. No.: 14/466,760

(22) Filed: Aug. 22, 2014

(65) Prior Publication Data

US 2015/0064976 A1 Mar. 5, 2015

(30) Foreign Application Priority Data

Aug. 27, 2013 (FR) ...................................... 13 58210

(51) Int. Cl.

| | |
|---|---|
| ***H01R 24/00*** | (2011.01) |
| ***H01R 33/00*** | (2006.01) |
| ***H01M 2/20*** | (2006.01) |
| ***H01R 13/405*** | (2006.01) |
| ***H01R 13/42*** | (2006.01) |
| ***H01R 13/436*** | (2006.01) |
| ***H01R 13/502*** | (2006.01) |
| ***H01R 24/28*** | (2011.01) |

(Continued)

(52) U.S. Cl.
CPC .............. *H01R 13/405* (2013.01); *H01R 13/42* (2013.01); *H01R 13/4361* (2013.01); *H01R 13/502* (2013.01); *H01R 24/28* (2013.01); *H01R 43/26* (2013.01); *H01R 2103/00* (2013.01); *Y10T 29/49208* (2015.01)

(58) Field of Classification Search
CPC .... H01R 13/405; H01R 13/42; H01R 13/502; H01R 13/5025; H01R 24/28; H01R 43/26; H01R 13/4534; H01R 24/00; H01R 33/00; H01M 2/20
USPC ........... 439/627, 687, 696, 731; 320/113–115
See application file for complete search history.

(56) References Cited

U.S. PATENT DOCUMENTS 3,973,179 A * 8/1976 Weber ......................... B25F 3/00 200/332.2
6,068,519 A 5/2000 Lok (Continued)

OTHER PUBLICATIONS

Search Report in Priority French Application No. 1358210, dated Apr. 30, 2014.

*Primary Examiner* — Abdullah Riyami
*Assistant Examiner* — Harshad Patel
(74) *Attorney, Agent, or Firm* — Knobbe, Martens, Olson & Bear, LLP

(57) ABSTRACT

This device (4) for electrically connecting an electric power supply source (8) such as a battery to an electric appliance (2), is characterized in that it comprises:

- at least two conductive elements (16, 18) in tended for electrically connecting the electric power supply source (8) to the electric appliance (2), each conductive element (16, 18) defining an aperture (58, 60);
- a shell (10) capable of receiving the conductive elements, the shell comprising a first half-shell (12) and a second half-shell (14), the shell defining at least two slots (42, 44) capable of receiving the conductive elements and of maintaining said conductive elements substantially parallel to each other, the shell further comprising at least one locking member (46) capable of engaging into the apertures of the conductive elements and of maintaining said conductive elements engaged in said slots of the shell.

Application to a linear actuator intended to receive a removable tool.

13 Claims, 4 Drawing Sheets

(51) Int. Cl.
*H01R 43/26* (2006.01)
*H01R 103/00* (2006.01)

(56) References Cited

U.S. PATENT DOCUMENTS

| | | | | |
|---|---|---|---|---|
| 6,653,815 | B2 * | 11/2003 | Watson | B25F 5/02 320/114 |
| 7,170,006 | B1 | 1/2007 | Burrell et al. | |
| 8,182,274 | B1 | 5/2012 | Cheng et al. | |
| 8,851,924 | B2 * | 10/2014 | Fleischmann | F04D 25/08 439/587 |
| 2009/0017701 | A1 | 1/2009 | Ma | |
| 2013/0098646 | A1 * | 4/2013 | Funabashi | B25F 5/00 173/2 |
| 2013/0154565 | A1 | 6/2013 | Sakai et al. | |

* cited by examiner

DEVICE FOR ELECTRICALLY CONNECTING AN ELECTRIC POWER SUPPLY SOURCE TO AN ELECTRIC APPLIANCE, CORRESPONDING ELECTRIC APPLIANCE AND ELECTRIC CONNECTION METHOD

FIELD OF THE INVENTION

The present invention relates to a device for electrically connecting a power supply source to an electric appliance.

In particular, the present invention relates to a device for electrically connecting a battery to a linear actuator intended to receive a removable tool.

BACKGROUND OF THE INVENTION

Conventionally, this type of device comprises connectors intended for electrically connecting the power supply source to the electric appliance. In order to maintain a good connection of the electric power supply source to the electric appliance, it is necessary that these connectors be rigidly attached to the electric appliance, and that the electric wires be brazed on these connectors.

SUMMARY OF THE INVENTION

An object of the invention is to propose a device for electrically connecting an electric power supply source such as a battery to an electric appliance, wherein the connectors are rigidly attached to the electric appliance, without requiring additional components, and which allows convenient brazing of the wires on the connectors.

For this purpose, the object of the invention is a device for electrically connecting a battery to an electric appliance, characterized in that it comprises:

at least two conductive elements intended for electrically connecting the power supply source to the electric appliance, each conductive element defining an aperture;

a shell capable of receiving the conductive elements, the shell comprising a first half-shell and a second half-shell, the shell defining at least two slots capable of receiving the conductive elements and of maintaining said conductive elements substantially parallel to each other, the shell further comprising at least one locking member capable of engaging into the apertures of the conductive elements and of maintaining said conductive elements engaged in said slots of the shell.

The device according to the invention may comprise one or more of the following features, taken individually or according to any technically possible combination:

each conductive element comprises a conductive plate extending along a longitudinal direction;

each conductive element comprises an electric connection area with the electric appliance, each electric connection area comprising a connecting wire intended for electrically connecting the conductive element to the electric appliance;

the shell comprises at least one plate for supporting the conductive elements, the slots being defined by said or each supporting plate;

said or each supporting plate comprises at least one vertical rib connecting the supporting plate to the shell;

le said or each locking member comprises a locking platelet extending along a transverse direction; and the slots are defined in the first half shell, the locking member being borne by the second half-shell.

The object of the invention is also an electric appliance comprising an electric connection device as described above.

The object of the invention is also a method for electrically connecting an electric power supply source invention to an electric appliance, comprising the following steps:

providing a device for electrically connecting the electric power supply source invention to the electric appliance, the electric appliance comprising:

- at least two conductive elements intended for electrically connecting the electric power supply source invention to the electric appliance, each conductive element defining an aperture, each conductive element comprising an area for electric connection with the electric appliance, each electric connection area comprising a connecting wire intended for electrically connecting the conductive element to the electric appliance; and
- a shell capable of receiving the conductive elements, the shell comprising a first half shell and a second half shell, the shell defining at least two slots capable of receiving the conductive elements and of maintaining said conductive elements substantially parallel to each other, the shell further comprising at least one locking member capable of engaging into the apertures of the conductive elements;

connecting the connecting wires to the electric connection areas;

inserting the conductive elements into the slots of the shell;

inserting said or each locking member into the apertures of the conductive elements for maintaining said conductive elements engaged into said slots; and connecting the electric power supply source to the conductive elements.

BRIEF DESCRIPTION OF THE DRAWINGS

The invention will be better understood upon reading the description which follows only given as an example and made with reference to the appended drawings, wherein.

DETAILED DESCRIPTION OF THE PREFERRED EMBODIMENT

Figure 1:
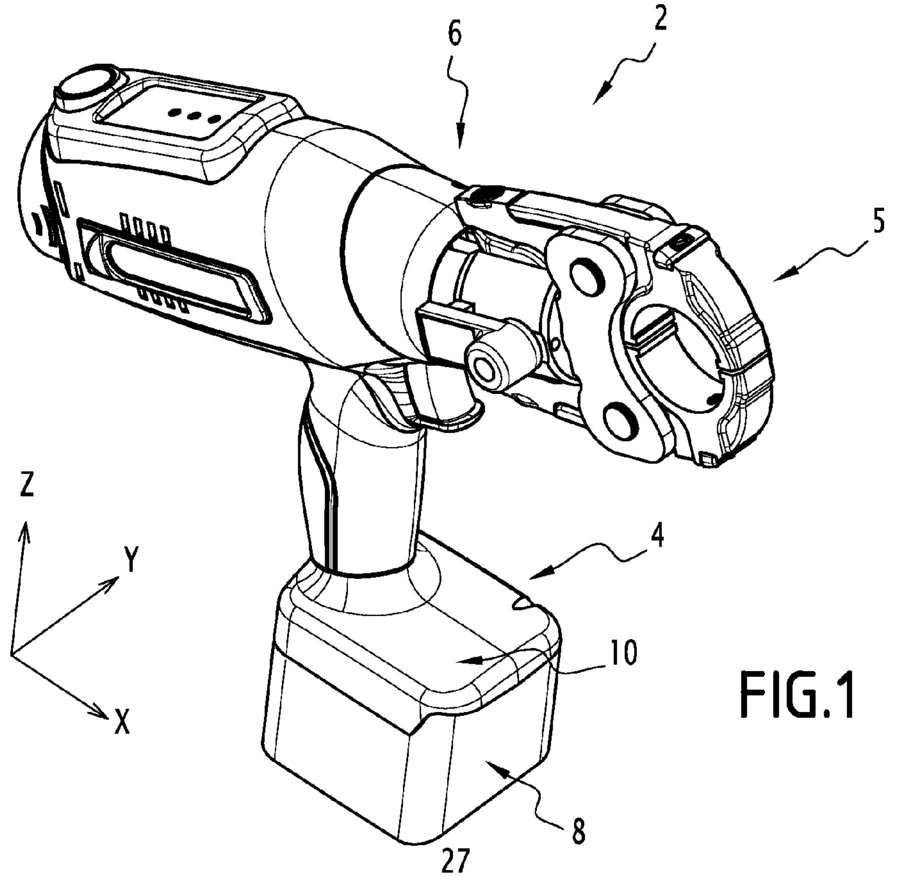
FIG. 1 is a perspective view of an electric appliance according to the invention.
Figure 2:
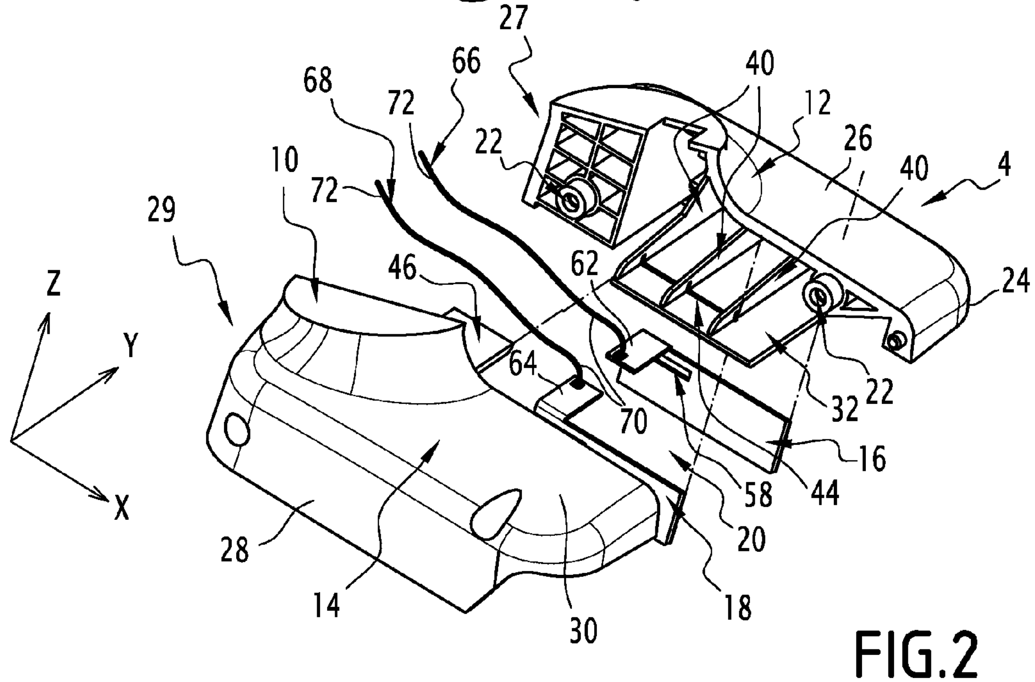
FIGS. 2 and 3 are exploded perspective views of an electric connection device according to the invention.
Figure 3:
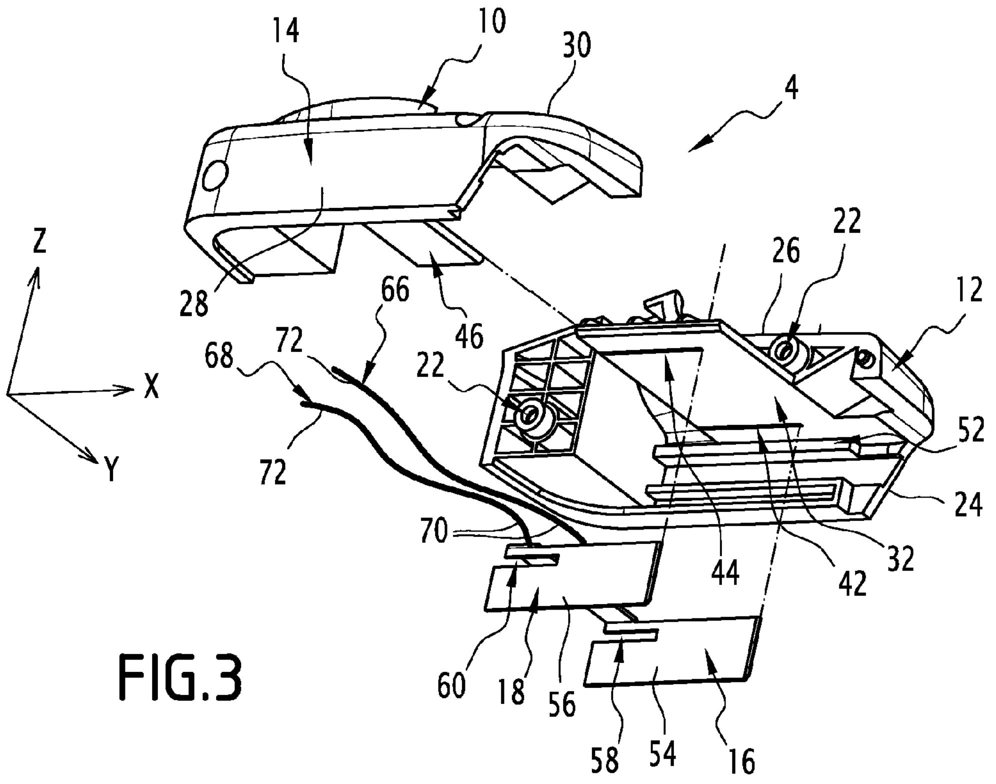

In all the following, the orientation terms are meant with respect to the orthogonal reference system taken as a reference in the sense of normal use of the electric appliance, illustrated in FIGS. 1 to 3, and wherein are distinguished:

a horizontal, longitudinal axis X, extending from the rear to the front of the electric appliance;

a horizontal, transverse axis Y, extending from right to left; and a vertical axis Z, extending from bottom to top.

The term of "horizontal" is defined with respect to the XY plane, the term of "vertical" is defined with respect to the XZ or YZ plane.

An electric appliance 2 comprising an electric connection device 4 according to the invention is illustrated in FIG. 1.

The electric appliance 2 is for example a portable machine tool, such as a linear actuator, intended for receiving a removable tool 5.

The electric appliance 2 according to the invention comprises a functional portion 6, an electric power supply source 8 such as a battery, and the device 4 for electrically connecting the battery 8 to the actuator 2.

As the functional portion 6 of the actuator 2 is not the object of the invention, the latter will not be described in more detail subsequently.

As visible in FIGS. 2 and 3, the electric connection device 4 comprises a shell 10 consisting of a first half-shell 12 and of a second half-shell 14, and a pair of conductive elements 16, 18 intended for electrically connecting the battery 8 and the actuator 2.

The first half-shell 12 and the second half-shell 14 are capable of being attached to one another. When they are attached to each other, the first and second half-shells 12, 14 define an inner space 20 for receiving the conductive elements 16, 18. The inner space 20 is open towards the front and towards the bottom so that the battery 8 may be inserted therein.

The first half-shell 12 and the second half-shell 14 are removably attached to each other, via removable attachment means such as, for example, screws (not shown), intended to be screwed into holes 22 of the half shell 12.

The first half-shell 12 comprises a first sidewall 24 substantially extending vertically, and a first substantially horizontal upper wall 26 positioned between the first sidewall 24 and the functional portion 6 of the actuator 2. It also comprises a reinforced rear wall 27.

Also, the second half-shell 14 comprises a second substantially vertical sidewall 28, a second substantially horizontal upper wall 30 between the second sidewall 28 and the functional portion 6 of the actuator 2, and a reinforced rear wall 29.

The first half-shell 12 comprises a plate 32 for supporting the conductive elements 16, 18. The supporting plate 32 extends horizontally in the inner space 20.

Figure 7:
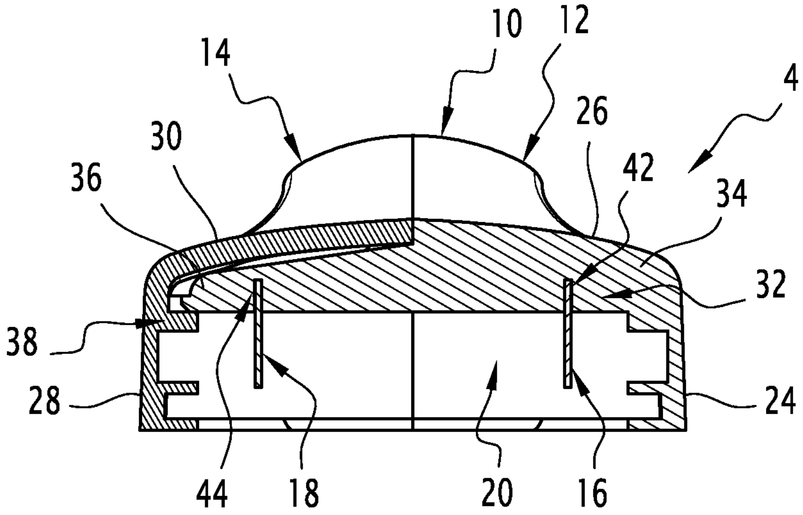
FIG. 7 is a sectional view taken along the plane VII of FIG. 5; et

As visible in FIG. 7 for example, the supporting plate 32 comprises a first end 34 connected to the first half-shell 12 and a second free end 36 transversely opposite to the first end 34.

The first end 34 of the supporting plate 32 is a rigidly connected to the first sidewall 24. The supporting plate 32 is for example made together with the first sidewall 24 out of the same material.

As visible in FIG. 7, the second free end 36 is capable of bearing upon a horizontal protruding portion 38 of the second half-shell 14.

Figure 5:
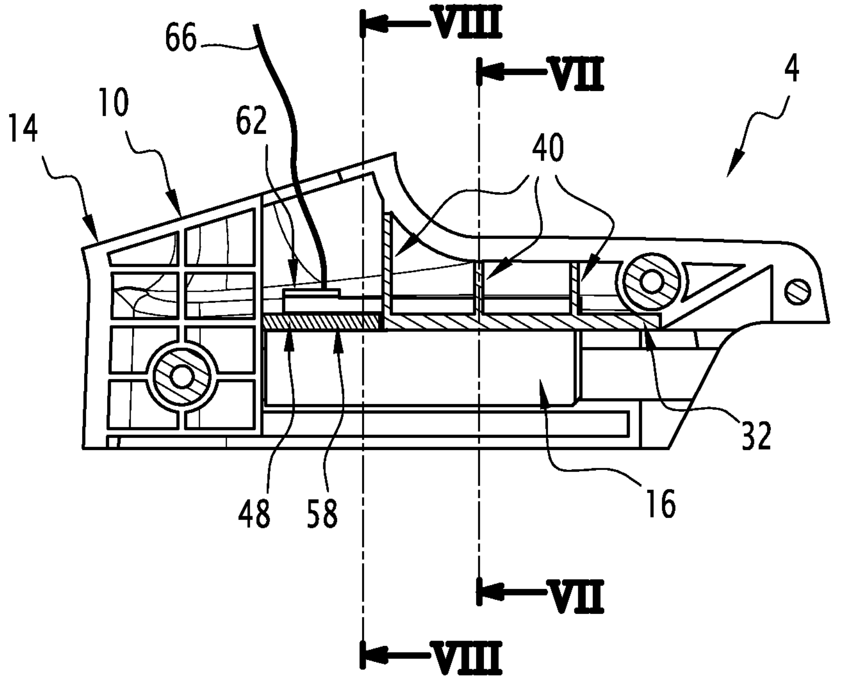
FIG. 5 is a sectional view taken along the plane V of FIG. 4.

The supporting plate 32 is further rigidly connected to the first upper wall 26, via vertical maintaining ribs 40, visible in FIGS. 2 and 5 for example. The maintaining ribs 40 are preferably positioned parallel to each other. In the example illustrated in FIGS. 2 and 5, the supporting plate 32 comprises three maintaining ribs 40. The maintaining ribs 40 allow reinforcement of the attachment of the supporting plate 32 on the first half-shell 12.

The supporting plate 32 defines two horizontal slots 42, 44 positioned parallel to each other. The slots 42, 44 extend substantially perpendicularly to the vertical ribs 40.

Figure 4:
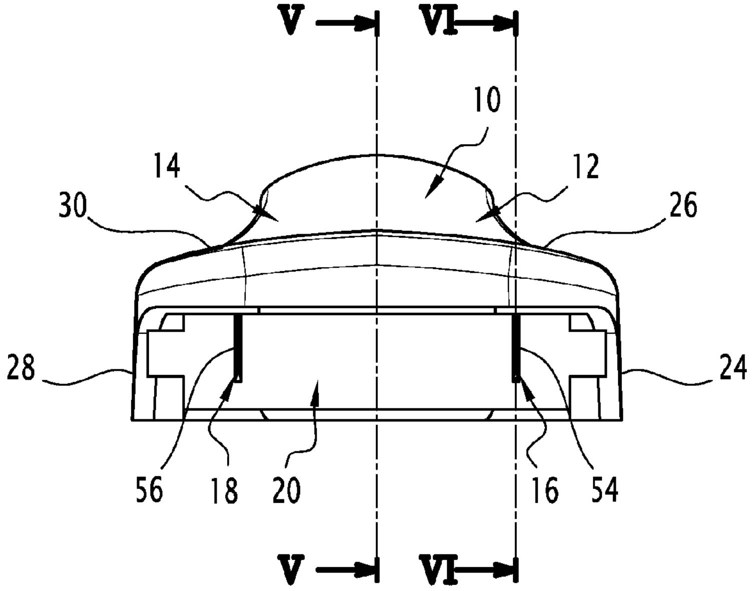
FIG. 4 is a view of the front of the electric connection device of FIGS. 2 and 3.

The slots 42, 44 are capable of receiving the conductive elements 16, 18 and of maintaining them substantially parallel to each other, as visible in FIG. 4 for example. The slots 42, 44 are adjusted with respect to the conductive elements 16, 18 which they receive, i.e. their width is substantially equal to or slightly greater than the width of the conductive elements 16, 18, as visible in FIG. 7. Thus, the insertion of the conductive elements 16, 18 into the slots 42, 44 gives the possibility of ensuring that the conductive elements 16, 18 are held vertically in the shell 10.

Figure 8:
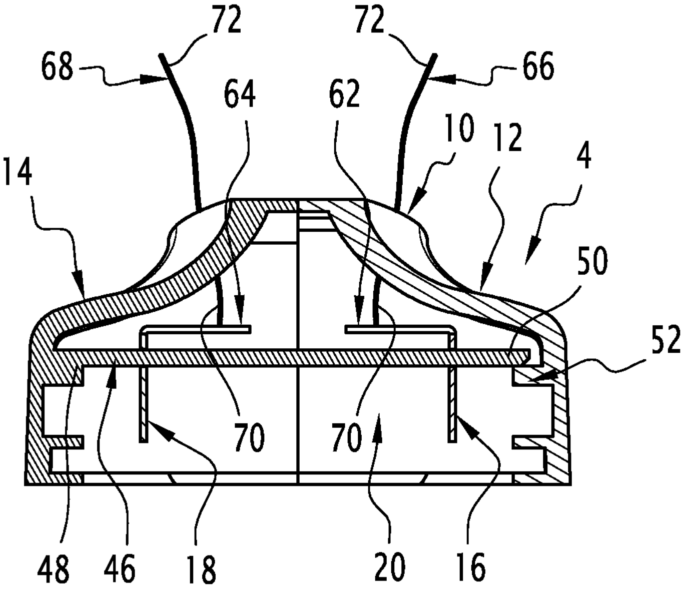
FIG. 8 is a sectional view taken along the plane VIII of FIG. 5.

As visible in FIGS. 2, 3 and 8 for example, the second half-shell 14 comprises a locking member, such as a locking platelet 46, transversely extending along the axis Y. As this will be described in more detail subsequently, the locking platelet 46 is capable of maintaining the conductive elements 16, 18 engaged in the slots 42, 44 of the first half-shell 12.

The locking platelet 46 comprises a first end 48 connected to the second half-shell 14 and a second free end 50 transversely opposite to the first end 48.

The first end 48 of the locking platelet 46 is rigidly connected to the second sidewall 28. The locking platelet 46 is for example made with the second sidewall 28 in the same material.

As visible in FIG. 8, the second free end 50 of the locking platelet 46 is capable of bearing upon a horizontal protruding portion 52 of the first half-shell 12.

As visible in FIGS. 2 and 3, each conductive element 16, 18 comprises a conductive plate 54, 56 extending vertically in the inner space 20.

Each conductive plate 54, 56 defines a transverse slot 58, 60 for receiving the locking platelet 46.

Figure 6:
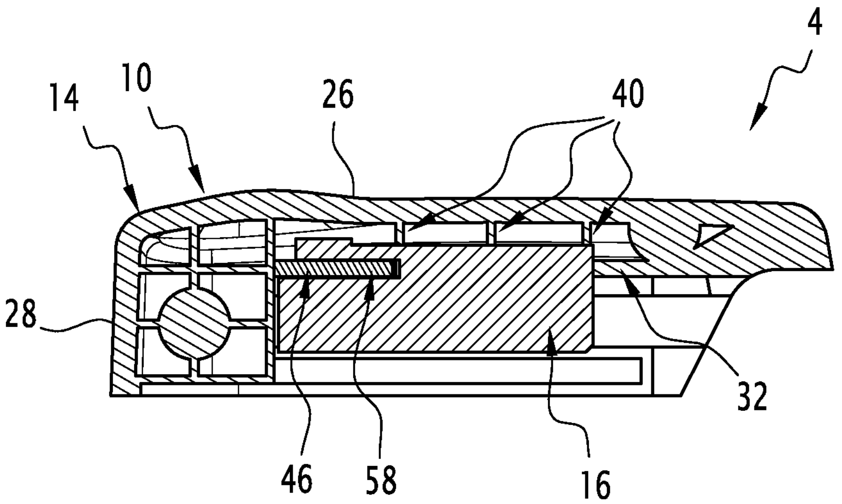
FIG. 6 is a sectional view taken along the plane VI of FIG. 4.

The locking platelet 46 is capable of engaging into the slots 58, 60 of the conductive elements 16, 18. As visible in FIG. 6, the slots 58, 60 are adjusted with respect to the locking platelet 46 which they receive, i.e. their vertical dimension is substantially equal to or slightly greater than the vertical dimension of the locking platelet 46.

Further, each conductive plate 54, 56 comprises at its upper portion a tab folded back horizontally towards the other plate 54, 56, which defines an area 62, 64 for electric connection with the actuator 2. Each electric connection area 62, 64 comprises a connecting wire 66, 68 intended for electrically connecting the conductive plate 54, 56 and the actuator 2.

Each connecting wire 66, 68 comprises a first end 70 intended to be attached to an electric connection area 62, 64, and a second end 72 opposite to the first end and intended to be attached to the actuator 2.

For electrically connecting the battery 8 to the actuator 2, the first ends 70 of the connecting wires 66, 68 are attached to the connection areas 62, 64 of the conductive plates 54, 56, for example by welding. The second ends 72 of the connecting wires 66, 68 are attached beforehand to the actuator 2.

Next, both conductive plates 54, 56 are inserted into the slots 42, 44 of the supporting plate 32 of the first half-shell 12. The conductive plates 54, 56 are then positioned and maintain vertically, parallel to each other.

Next, the locking platelet 46 is inserted into the slots 58, 60 of the conductive plates 54, 56, by bringing the second half-shell 14 closer to the first half-shell 12, until the first half-shell 12 and the second half-shell 14 join up and form the inner space 20.

In this configuration, the locking platelet 46 is inserted into the slots 58, 60 of the conductive plates 54, 56, and the free end 50 of the locking platelet 46 rests on the horizontal protruding portion 52 of the first half-shell 12. Further, the free end 36 of the supporting plate 32 rests on the horizontal protruding portion 38 of the second half-shell 14. The conductive plates 54, 56 are then maintained engaged in the slots 42, 44 of the supporting plate 32, via the locking platelet 46.

The conductive plates 54, 56 are in this way rigidly attached and maintained in position in the shell 10.

The first and second half-shells 12, 14 are then attached together, by inserting the screws into the holes 22.

Finally, the battery 8 is connected to the conductive plates 54, 56, for example by a movement of the battery 8 from the front to the rear of the actuator 2.

Alternatively, the device 4 comprises more than two conductive elements 16, 18, the additional conductive element(s) for example playing the role of a temperature or voltage sensor.

The invention claimed is:

1. A device for electrically connecting an electric power supply source to an electric appliance, wherein the device comprises:

at least two conductive elements configured to electrically connect the electric power supply source to the electric appliance, each conductive element defining an aperture;

a shell capable of receiving the conductive elements, the shell comprising a first half-shell and a second half-shell, the shell defining at least two slots capable of receiving the conductive elements and of maintaining said conductive elements substantially parallel to each other, the shell further comprising at least one locking member capable of engaging into the apertures of the conductive elements and of maintaining said conductive elements engaged in said slots of the shell, wherein each conductive element comprises an electric connection area configured to electrically connect with the electric appliance, each electric connection area comprising a connecting wire configured to electrically connect the conductive element to the electric appliance.

2. The device according to claim 1, wherein each conductive element comprises a conductive plate extending along a longitudinal direction.

3. The device according to claim 1, wherein said or each locking member comprises a locking platelet extending along a transverse direction.

4. The device according to claim 1, wherein the slots are defined in the first half-shell, the locking member being borne by the second half-shell.

5. The device according to claim 1, wherein the shell comprises at least one plate for supporting the conductive elements, the slots being defined by said or each supporting plate.

6. The device according to claim 5, wherein said or each supporting plate comprises at least one vertical rib connecting the supporting plate to the shell.

7. The device according to claim 5, wherein said or each locking member comprises a locking platelet extending along a transverse direction.

8. The device according to claim 5, wherein the slots are defined in the first half-shell, the locking member being borne by the second half-shell.

9. An electric appliance, wherein the electric appliance comprises a device configured to electrically connect an electric power supply source to the electric appliance according to claim 1.

10. The electric appliance according to claim 9, wherein the electric power supply source is a battery.

11. The device of claim 1, wherein the electric power supply source is a battery.

12. A method for electrically connecting an electric power supply source to an electric appliance, comprising the following steps:

providing a device configured to electrically connect the electric power supply source to the electric appliance, the device comprising:

at least two conductive elements configured to electrically connect the electric power supply source to the electric appliance, each conductive element defining an aperture, each conductive element comprising an electric connection area for electric connection with the electric appliance, each electric connection area comprising a connecting wire configured to electrically connect the conductive element to the electric appliance; and a shell capable of receiving the conductive elements, the shell comprising a first half-shell and a second half-shell, the shell defining at least two slots capable of receiving the conductive elements and of maintaining said conductive elements substantially parallel to each other, the shell further comprising at least one locking member capable of engaging into the apertures of the conductive elements;

connecting the connecting wires to the electric connection areas;

inserting the conductive elements into the slots of the shell;

inserting said or each locking member into the apertures of the conductive elements in order to maintain said conductive elements engaged in said slots; and connecting the electric power supply source to the conductive elements.

13. The method of claim 12, wherein the electric power supply source is a battery.

* * * * *